United States Patent [19]
Rosso

[11] 3,767,028
[45] Oct. 23, 1973

[54] PACKAGE INVERTER
[75] Inventor: Victor Del Rosso, Ithaca, N.Y.
[73] Assignee: Hi-Speed Checkweigher Co., Inc., Ithaca, N.Y.
[22] Filed: Nov. 5, 1970
[21] Appl. No.: 87,163

[52] U.S. Cl............................ 198/33 AC, 198/165
[51] Int. Cl........................ B65g 47/24, B65g 15/14
[58] Field of Search .................... 198/33 AC, 33 R, 198/184, 187, 198, 165, 160

[56] References Cited
UNITED STATES PATENTS
| 2,988,199 | 6/1961 | Pinkham | 198/33 AC |
| 2,732,058 | 1/1956 | Negra | 198/184 |
| 2,604,200 | 7/1952 | Hohl | 198/33 AC |
| 1,718,812 | 6/1929 | Doney | 198/187 |
| 2,929,489 | 3/1960 | Parrish | 198/33 AC |
| 564,163 | 7/1896 | Schaake | 198/33 AC |

Primary Examiner—Richard E. Aegerter
Attorney—Bean and Bean

[57] ABSTRACT

A mechanism for inverting articles during passage thereof along a substantially straight line path of travel including a single endless drive belt twisted through 180° and trained about vertically disposed rollers arranged on opposite sides of the path of travel adjacent inlet and outlet ends of the mechanism, and guide devices arranged to maintain articles in surface engagement with a driving flight of the belt for passage between the ends of the mechanism.

4 Claims, 5 Drawing Figures

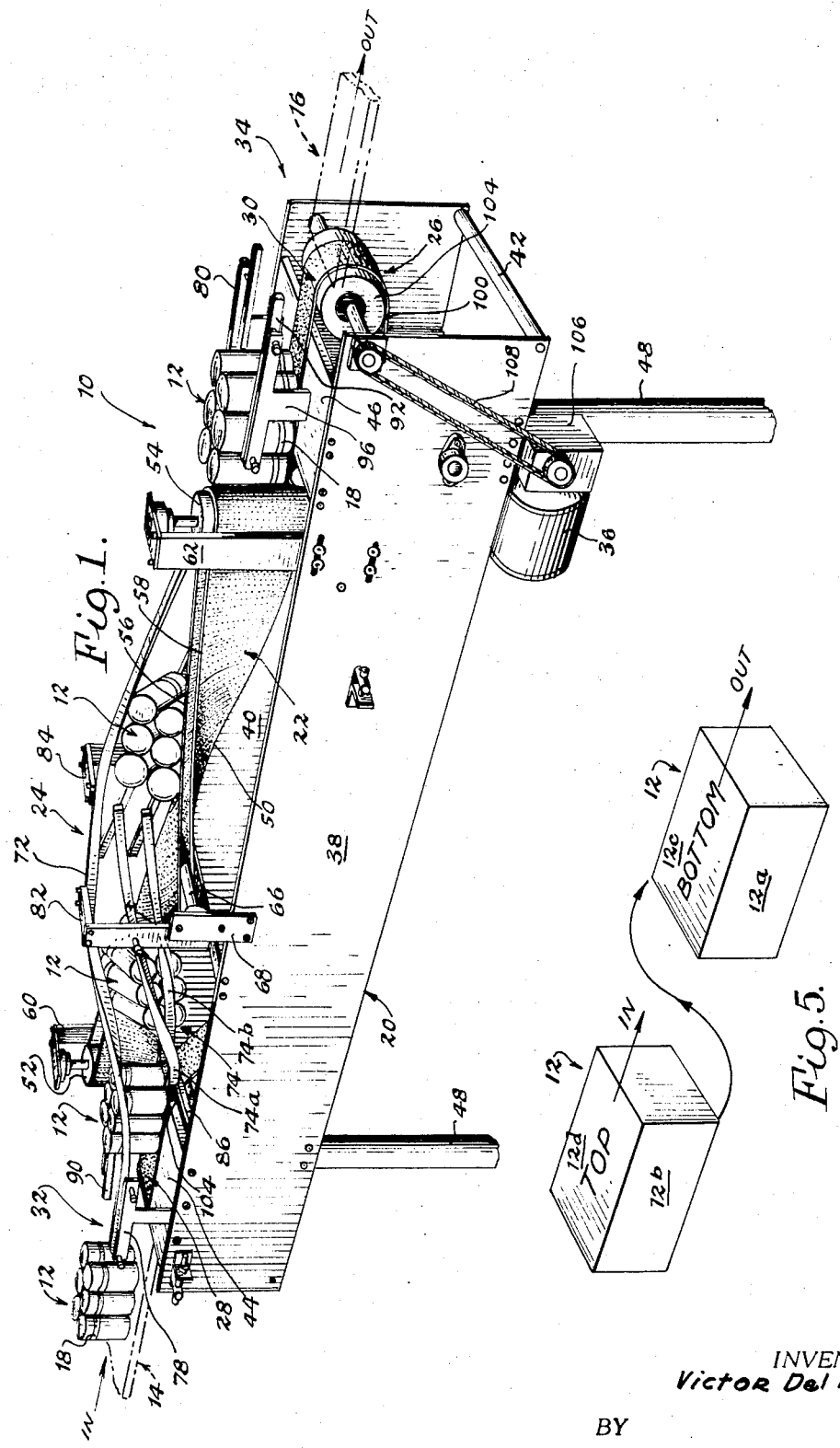

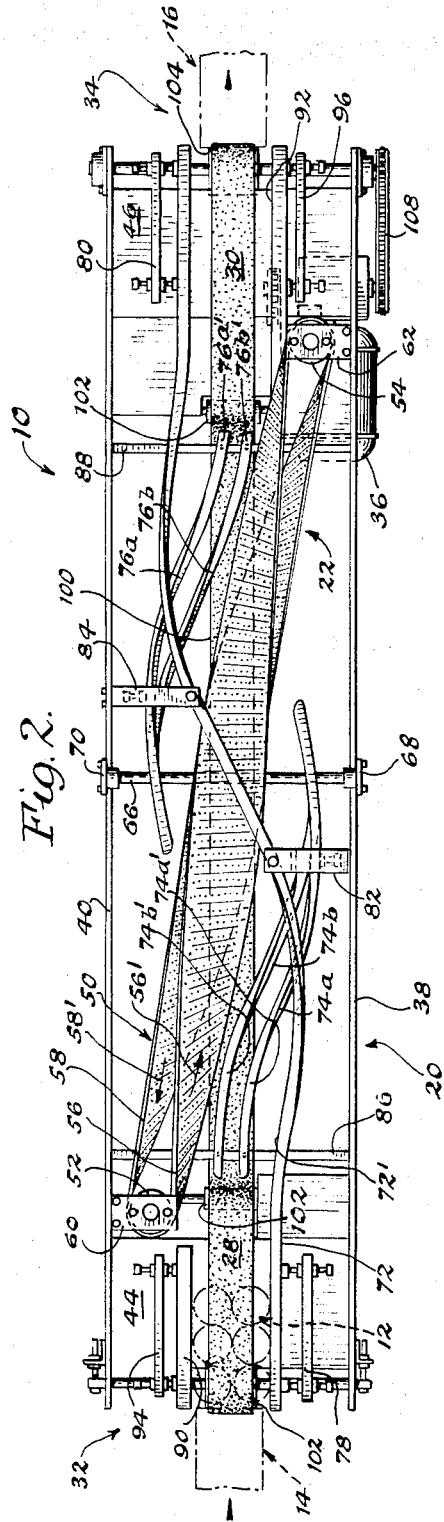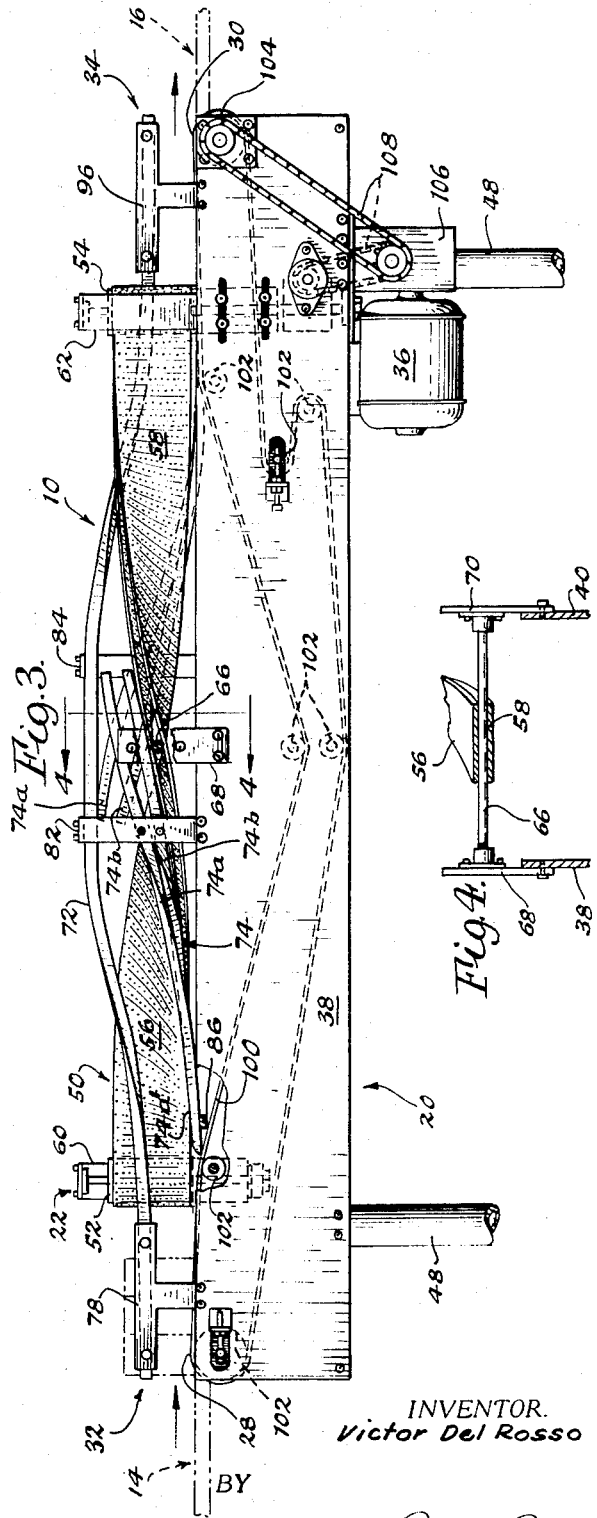

3,767,028

PACKAGE INVERTER

SUMMARY OF THE INVENTION

The present invention generally relates to mechanisms for inverting articles, including containers, packages or the like, and more particularly to a mechanism for automatically inverting "six packs" as the latter are passed through the mechanism along a straight line path of travel between article handling stations.

The mechanism of the present invention features a single endless drive belt, which is twisted through 180° in passing between vertically disposed drive and idler rollers arranged on opposite sides of the path of travel adjacent the inlet and outlet ends of the mechanism.

In the preferred form of the present invention, stationary guide devices are employed to maintain articles passing through the mechanism in surface driven engagement with a driving flight of the drive belt. Articles are presented for and removed from engagement with the driving flight of the belt by an auxiliary endless belt conveyor, which defines horizontally moving flights adjacent the inlet and outlet ends of the mechanism.

DRAWINGS

The nature and mode of operation of the present invention will now be more fully described in the following detailed description taken with the accompanying drawings wherein:

FIG. 1 is a perspective view of the inverting mechanism according to the present invention;

FIG. 2 is a top plan view of the mechanism shown in FIG. 1;

FIG. 3 is a side elevational view of the mechanism shown in FIG. 1;

FIG. 4 is a sectional view taken generally along the line 4—4 in FIG. 3; and

FIG. 5 is a view illustrating the relative positions of an article adjacent the inlet and outlet ends of the mechanism.

DETAILED DESCRIPTION

The inverting mechanism of the present invention, which is generally designated as 10 in FIGS. 1–3, will now be described with particular reference to its use in inverting articles 12 of generally hexahedral configuration as the latter are passed along a substantially straight line path between mechanism infeed and withdrawal conveyors 14 and 16, which extend from diverse article handling stations, not shown. For purposes of description only, articles 12 are shown as being in the form of "six packs" of canned beverages, wherein the cans are bound together only adjacent their upper ends by conventional plastic bonding or holder 18. Alternatively, the individual cans may be bound together by a heavy paper wrapper or enclosed within a suitable packaging container. Moreover, as will be apparent, mechanism 10 may be modified to accommodate articles of other than the hexahedral configuration illustrated.

Again referring to FIGS. 1–3, it will be seen that mechanism 10 generally includes a framework 20 on which are mounted an article transporting and inverting conveyor 22; stationary guide devices, which are generally designated as 24; an auxiliary conveyor 26 having conveyor flights 28 and 30, which are arranged adjacent inlet and outlet ends 32 and 34 of mechanism 1, respectively, for directing articles 12 into and removing such articles from association with conveyor 22; and an electric motor 36 for powering conveyors 22 and 26.

Framework 20 includes a pair of horizontally spaced side plates 38 and 40, which are fixed in a parallel relationship by cross members including spacer rods, only one being shown at 42 in FIG. 1; inlet and outlet end plates 44 and 46, which are arranged to support auxiliary conveyor flights 28 and 30, respectively; and suitable mounting brackets or support plates, not shown, to which mechanism supporting pedestals 48 are affixed.

Conveyor 22 includes an endless drive belt 50, which is trained about idler and drive rollers 52 and 54, so as to define drive and return flights 56 and 58 movable in the directions indicated by arrows 56' and 58', respectively. Rollers are supported for rotation about substantially parallel vertically disposed axes by brackets 60 and 62, respectively. As best shown in FIG. 2, brackets 60 and 62 are affixed to side plates 38 and 40 adjacent mechanism inlet and outlet ends 32 and 34, such that rollers 52 and 54 are arranged on opposite sides of the path of travel of article 12 through mechanism 1. As will be apparent, belt drive flight 56, as well as return flight 58, is twisted through 180° between rollers 52 and 54 and disposed to extend horizontally across the path of article travel. Preferably the drive surface of belt 50 is roughened as by providing projections or fingers to provide a gripping surface or arranged to define spaced ribs extending transversely of the direction of belt travel.

A bearing rod or roller 66 is supported by side plate mounted brackets 68 and 70, so as to extend horizontally in a direction transversely of mechanism 1 at a point intermediate rollers 52 and 54. As will be apparent from viewing FIGS. 3 and 4, guide roller 66 serves to maintain the drive flight 56 in a horizontally disposed position at its mid point, as well as to separate the belt flights and in order to prevent abrasion therebetween.

Guide devices 24 include a main guide bar 72, and a pair of support guide devices 74 and 76, which cooperate with main guide bar 72 to maintain articles 12 in frictional engagement with the drive surface of conveyor flight 56.

Main guide bar 72 is formed with an article engaging guide surface 72', which is twisted through substantially 180°, such that guide surface 72' is arranged in a facing, spaced relationship with the drive surface of conveyor flight 56 substantially throughout the length thereof. Thus, belt flight 56 and guide surface 72' are arranged to engage opposite side surfaces 12a and 12b of article 12, as the latter is inverted while being transported by the drive belt between the positions illustrated in FIG. 5. Main guide bar 72 is adjustably supported adjacent its respective ends, which extend beyond belt flight 56, by side plate mounted brackets 78 and 80, and supported adjacent its mid portion by side mounted brackets 82 and 84. As will be apparent, bar 72 may be of plural or single piece construction, as desired.

It will be understood that for low speed operating conditions, the portion of guide bar 72 extending between brackets 82 and 84 may be omitted, since at this point the weight of article 12 is normally sufficient to maintain the article in engagement with the drive flight as the latter changes directions in passing over roller 66. This portion of the guide bar is, however, necessary when the drive flight is driven at high speeds to prevent the article from being thrown upwardly therefrom.

Guide devices 74 and 76 include guide bars 74a, 74b and 76a, 76b, which bars define guide surfaces 74a', 74b' and 76a', 76b', respectively. As will be apparent, guide surfaces 74a', 74b' and 76a', 76b', which are twisted through substantially 90° and extend from adjacent opposite end portions of drive flight 56 to points adjacent the mid point thereof, are operable to successively support opposite vertically facing surfaces 12c and 12d of articles 12, respectively. It will be understood upon viewing FIG. 1 that guide bars 74a, 74b are supported adjacent their respective ends by cross bar 86 and bracket 82, whereas bars 76a, 76b are supported adjacent their respective ends by bracket 84 and cross bar 88.

Additional guide bars 90 and 92, which are adjustably supported by framework mounted brackets 94 and 96, are arranged to cooperate with the respective ends of guide bar 72 to properly align articles 12 as the latter are transported by conveyor flights 28 and 30 into and out of association with drive flight 56.

Auxiliary conveyor 26 is best shown in FIGS. 2 and 3 as being in the form of an endless belt 100, which is trained over a plurality of idler rollers 102 and a drive roller 104. Belts 50 and 100 may be driven in the directions indicated by coupling drive rollers 54 and 104 to electric motor 36 by any suitable transmission, such as for instance gear box 106 and chain drives 108.

From the foregoing, it will be understood that whenever article 12 is presented adjacent the inlet end of mechanism 1 by conveyor 14, such article is picked up by conveyor flight 28 and transferred thereby to position its side surface 12a in association with the drive surface of drive flight 56 adjacent the inlet end thereof. The drive flight thereupon frictionally "picks up" and transports the article in sliding engagement with guide surface 72' and successively with guide surfaces 74a', 74b' and 76a', 76b' until the article is transferred to conveyor flight 30, which in turn delivers the article to withdrawal conveyor 16.

I claim:

1. A mechanism for inverting articles during passage along a substantially straight line path of travel extending through inlet and outlet ends of said mechanism, which comprises in combination:
   a conveyor having an endless belt trained about roller devices to define a drive flight and a return flight, said roller devices being supported for rotation about substantially parallel vertically disposed axes arranged one adjacent each of said inlet and outlet ends and on opposite sides of said path of travel, whereby to position inlet and outlet end portions of said drive flight adjacent said inlet and outlet ends and on opposite sides of said path of travel, said drive flight having an article engaging drive surface portion thereof twisted through substantially 180° between said inlet and outlet end portions thereof, said return flight being twisted through substantially 180° whereby to arrange said drive and return flights in an essentially uniform spaced relationship, and said conveyor additionally includes a guide roller, said guide roller being substantially horizontal and extending transversely of said path of travel for engagement with facing surfaces of said drive and return flights adjacent midpoints thereof, whereby to maintain said facing surfaces out of engagement and at least said drive surface portion essentially horizontal adjacent midpoints thereof;
   conveyor drive means connected to at least one of said roller devices; and
   stationary guide means to maintain articles in driven engagement with said drive surface portion intermediate said roller devices.

2. A mechanism for inverting articles during passage along a substantially straight line path of travel extending through inlet and outlet ends of said mechanism, which comprises in combination:
   a conveyor having a drive flight, said drive flight having an inlet end portion arranged adjacent said inlet end on one side of said path of travel and an outlet end portion arranged adjacent said outlet end on an opposite side of said path of travel, said drive flight having an article engaging drive surface portion thereof twisted through substantially 180° between said end portions thereof;
   means to drive said conveyor;
   stationary guide means to maintain articles in driven engagement with said drive surface portion of said drive flight intermediate said inlet and outlet end portions thereof; and
   a single auxiliary endless conveyor belt, said auxiliary conveyor belt forming conveyor flights aligned with said path of travel for directing articles into and removing articles from association with said drive surface portion of said drive flight adjacent said inlet and outlet end portions.

3. A mechanism for inverting articles during passage thereof along a substantially straight line path of travel extending through inlet and outlet ends of said mechanism, which comprises in combination:
   a framework;
   an endless belt conveyor, said belt being trained about roller devices arranged one adjacent each of said ends to define drive and return flights of said belt, at least said drive flight of said belt being twisted through substantially 180° in passing between said roller devices, said roller devices being mounted on said framework for rotation about substantially parallel vertically extending axes disposed adjacent opposite sides of said path of travel;
   stationary guide means mounted on said framework for maintaining an article in driven surface engagement with said drive flight of said belt, whereby said article is inverted while being conveyed between said ends;
   auxiliary conveyor means mounted on said framework, said auxiliary conveyor means defining conveyor flights aligned with said path of travel for directing articles into and removing articles from association with said drive flight; and
   means mounted on said framework for driving said conveyors.

4. A mechanism according to claim 3, wherein said auxiliary conveyor is an endless belt conveyor; and said guide means includes a stationary guide surface means and a pair of stationary guide surface means, the first said guide surface means being arranged to extend in a spaced facing relationship with said drive flight substantially throughout the length thereof, said first said guide surface means and said drive flight engaging oppositely facing surfaces of said article, said pair of stationary guide surface means being arranged to extend from adjacent opposite ends of said drive flight towards a midpoint thereof for successively engaging opposite vertically facing surfaces of said article, each of said pair of stationary guide surfaces being twisted through substantially 90°.

* * * * *